US011868955B2

(12) United States Patent
McDaniel et al.

(10) Patent No.: US 11,868,955 B2
(45) Date of Patent: Jan. 9, 2024

(54) SHIPPING PRINT COMPONENTS

(71) Applicant: Hewlett-Packard Development Company, L.P., Spring, TX (US)

(72) Inventors: Gabriel Scott McDaniel, Boise, ID (US); Paul L. Jeran, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 214 days.

(21) Appl. No.: 17/323,264

(22) Filed: May 18, 2021

(65) Prior Publication Data

US 2022/0374835 A1 Nov. 24, 2022

(51) Int. Cl.
*G06Q 10/0837* (2023.01)
*G06Q 10/30* (2023.01)
*G06Q 10/087* (2023.01)
*G06F 3/12* (2006.01)
*G06Q 10/20* (2023.01)

(52) U.S. Cl.
CPC ....... *G06Q 10/0837* (2013.01); *G06F 3/1219* (2013.01); *G06F 3/1229* (2013.01); *G06F 3/1292* (2013.01); *G06Q 10/087* (2013.01); *G06Q 10/20* (2013.01); *G06Q 10/30* (2013.01)

(58) Field of Classification Search
CPC .. G06Q 10/0837; G06Q 10/087; G06Q 10/20; G06Q 10/30; G06F 3/1219; G06F 3/1229; G06F 3/1292
See application file for complete search history.

(56) References Cited

U.S. PATENT DOCUMENTS

| | | | |
|---|---|---|---|
| 6,789,864 B2* | 9/2004 | Phillips | B41J 2/17506 347/7 |
| 9,323,483 B2* | 4/2016 | Venkatesh | G06F 3/1267 |
| 10,365,869 B2* | 7/2019 | Bhaskaran | G06F 3/1209 |
| 10,732,908 B2* | 8/2020 | Christman | B65C 9/40 |
| 2003/0026620 A1* | 2/2003 | Gallivan | G03G 15/5075 399/24 |
| 2005/0030554 A1* | 2/2005 | Dixon | B41J 29/38 358/1.1 |
| 2009/0201533 A1* | 8/2009 | Ray | G06Q 10/08 358/1.15 |
| 2011/0267631 A1* | 11/2011 | Campbell | G06Q 10/08 358/1.9 |
| 2012/0212768 A1* | 8/2012 | Evanitsky | H04L 67/562 358/1.15 |
| 2020/0372457 A1* | 11/2020 | Ripley | G06Q 10/0833 |
| 2021/0241245 A1* | 8/2021 | Schalk | G06Q 20/18 |
| 2021/0342769 A1* | 11/2021 | Ouchida | B33Y 50/02 |

\* cited by examiner

*Primary Examiner* — Michael Jared Walker
(74) *Attorney, Agent, or Firm* — Michael Dryja (57) ABSTRACT

In some examples, a computing device can include a processing resource and a memory resource storing instructions to cause the processing resource to determine, via an input, whether to sustainably process a print component associated with a printing device, determine, in response to a determination to sustainably process the print component a processing mechanism for the print component and a shipping location to ship the print component, and generate a shipping label for the print component associated with the shipping location.

11 Claims, 4 Drawing Sheets

SHIPPING PRINT COMPONENTS

BACKGROUND

Imaging systems, such as printers, copiers, etc., may be used to form markings on a physical medium, such as text, images, etc. In some examples, imaging systems may form markings on the physical medium by performing a print job. A print job can include forming markings such as text and/or images by transferring a print material (e.g., ink, toner, etc.) to the physical medium.

DETAILED DESCRIPTION

Imaging devices may include a supply of a print material. As used herein, the term "print material" refers to a substance which can be transported through and/or utilized by an imaging device. In some examples, print material can be, for instance, a material that when applied to a medium, can form representation(s) (e.g., text, images, models, etc.) on the medium during a print job. Print material may include ink, toner, polymers, metals, colorants, etc.

The print material can be deposited onto a physical medium. As used herein, the term "printing device" refers to any hardware device with functionalities to physically produce representation(s) (e.g., text, images, models, etc.) on the medium. In some examples, a "medium" may include paper, photopolymers, plastics, composite, metal, wood, fabric, or the like. A printing device can further include other functionalities such as scanning, faxing, and/or other printing device functionalities, and can perform print jobs when in receipt of a print job request from a computing device or other network (e.g., Internet) connected device.

A device, such as a computing device, can generate a print job request and transmit the print job request to the printing device. The printing device can perform the print job according to the received print job request.

The printing device can perform the print job by depositing print material onto a print medium from a print material supply or other print medium reloading device. As used herein, the term "print material supply" refers to a vessel including print material. For example, the print material supply can include print material that can be deposited onto a print medium to form text and/or images on the print medium during a print job. A print material supply can be, for instance, a process/toner cartridge (e.g., P-Cart/f-Cart), discrete supplies (e.g., toner, developer drum (including a toner cartridge), etc.), among other examples.

The printing device can utilize print components to perform the print job. As used herein, the term "print component" refers to a device to assist in performance of a print job. Print components may include a printing device itself, a printhead, drum, fuser, imaging and transfer assemblies, print material supplies, etc. For example, the printing device may utilize printheads, drums, fusers, imaging and transfer assemblies, in conjunction with print material supplies to perform print jobs. These print components can be characterized by device lifetime. As used herein, the term "device lifetime" refers to a length of time during which a device is used before the device becomes unable to perform its intended function. For example, as print jobs are performed, print material included in the print material supply may be depleted, components within the print material supply may become worn out, etc. As another example, as a printhead is utilized to deposit print material during print jobs, the printhead can experience wear, resulting in a lower print job quality. As a result, the device lifetime of print components may be reduced until it is at an end of use condition.

When print components reach their end of use condition (e.g., the point in the device lifetime at which a print component becomes unable to perform its intended function) or slightly before, another print component may be ordered and shipped for use by the printing device.

In previous approaches, packaging for the new print component may include a return shipping label for the end of use print component. A user could utilize the return shipping label to return the end of use print component back to a manufacturer, a third party, etc. End of use print components may be shipped to one location at which the end of use print components may be discarded when the print components may be able to be refilled, refurbished, and/or recycled. Additionally, return labels for end of use print components may not be intelligently generated, resulting in end of use print components being shipped to a first location rather than a second location, where the second location is located geographically closer to a user shipping the end of use print component than the first location.

Accordingly, such previous approaches may not provide for sustainable processing of end of use print components. End of use print components that are discarded or recycled rather than refilled or refurbished and/or shipping end of use print components longer distances than they should can increase resource usage and carbon footprint. Additionally, generating and including a return shipping label in a new print component can be a financial liability for a manufacturer. Further, addresses included on the return shipping label may change over time (e.g., as a customer or manufacturer may change physical locations resulting in a different address), which could result in print components not being shipped to a correct location.

Shipping print components according to the disclosure can allow for dynamic and efficient determination of how to process an end of use print component and where to ship the end of use print component. Such determinations can extend the use of a print component through refilling of print material (e.g., in a print material supply), refurbishing of components, etc., extending the device lifetime of the print component. Accordingly, shipping print components according to the disclosure can provide a lifecycle assessment of print components that can increase sustainability and reduce a carbon footprint while reducing future financial liabilities of a manufacturer and also lowering a commitment to physical addresses, as compared with previous approaches.

Figure 1:
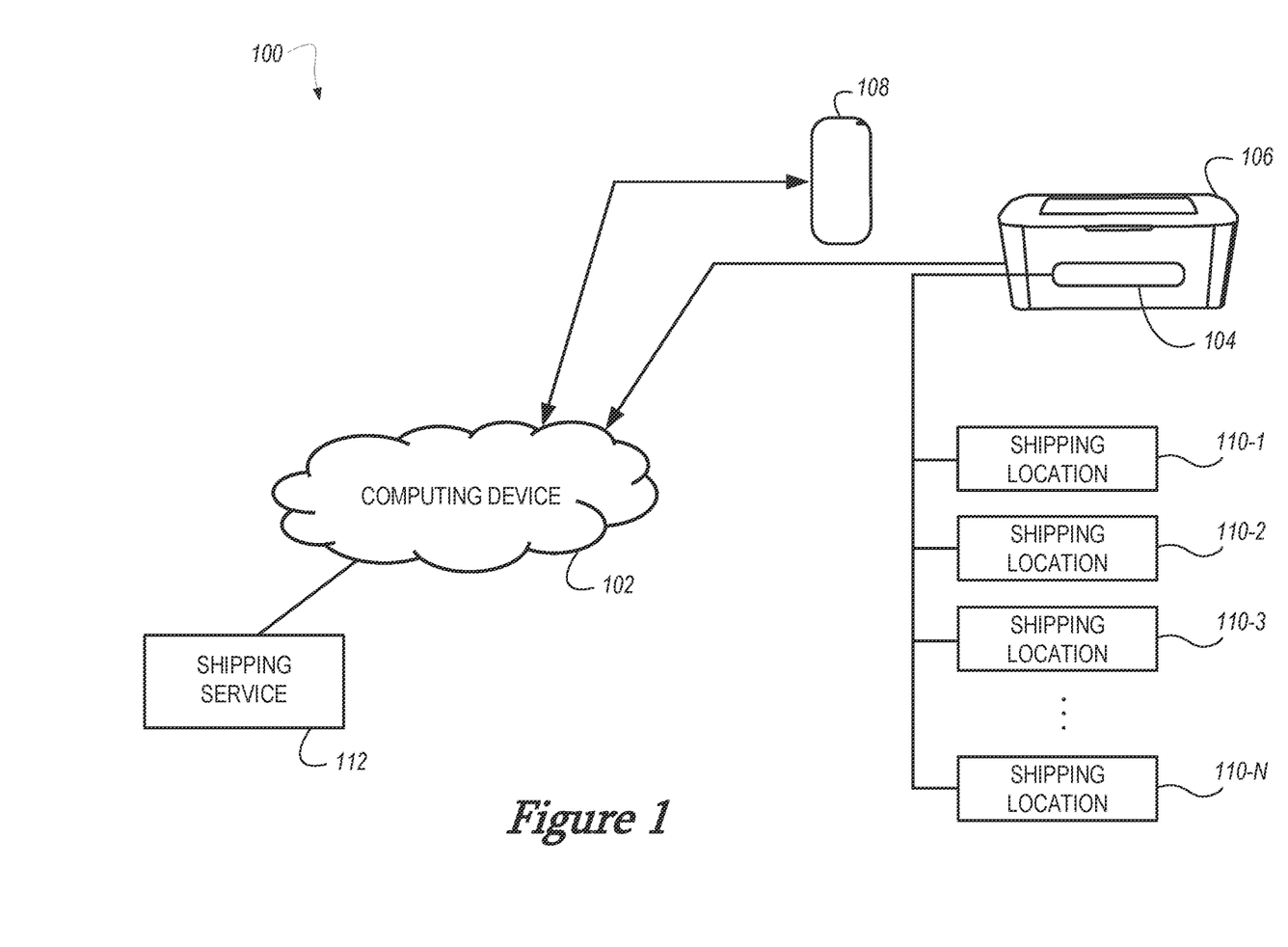
FIG. 1 is an example of a system for shipping print components consistent with the disclosure.

FIG. 1 is an example of a system 100 for shipping print components consistent with the disclosure. The system 100 can include a computing device 102, a print component 104, a printing device 106, a mobile device 108, a plurality of shipping locations 110-1, 110-2, 110-3, 110-N (referred to collectively herein as shipping locations 110), and a shipping service 112.

As is further described herein, the computing device 102 can determine a processing mechanism for the print component 104 and facilitate shipment to one of the shipping locations 110. Such determinations can ensure the print component 104 is processed sustainably. The printing device 106 can, in some examples, transmit attributes of the print component 104 to the computing device 102. As used herein, the term "print component attribute" refers to a property associated with a print component. Such attributes of the print component 104 transmitted to the computing device 102 can include, for example, an amount of print material in the print component 104 (e.g., when the print component is a print material supply), a usage rate of the print material by the printing device 106, a type of print component 104, among other examples.

As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, an All-In-One (AIO) computing device, networking equipment (e.g., router, switch, etc.), and/or a mobile device, among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices. The computing device 102 can represent, in some examples, a cloud computing environment.

The printing device 106 can be connected to the computing device 102 via a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

However, in some examples, the printing device 106 may not be directly connected to the computing device 102 via a network relationship. However, the printing device 106 may be connected to the mobile device 108 via a network relationship. Further, the mobile device 108 may be connected to the computing device 102 via another network relationship. The mobile device 108 may, in some examples, be utilized by a user associated with the printing device 106 and can communicate with the printing device 106 and/or the computing device 102. The mobile device 108 can, in some examples, utilize an application (e.g., an "app") associated with the printing device 106 to communicate and/or interact with the printing device 106, as is further described herein.

The computing device 102 can receive attributes of the print component 104 (e.g., from the printing device 106 and/or via the mobile device 108 connected to the printing device 106). The computing device 102 can determine, utilizing the received attributes, whether the print component 104 is at an end of use condition and should be replaced. For example, the computing device 102 can determine whether an amount of life remaining in the print component 104 is less than a threshold amount, as is further described herein.

In some examples, the amount of life remaining in the print component 104 can be associated with an amount of print material in the print component 104 when the print component 104 is a print material supply. For example, the computing device 102 can receive the attributes of the print component 104 and determine the amount of print material included in the print component 104 is less than a threshold amount. In such an instance, the computing device 102 can determine the print component 104 is at an end of use condition and in response, determine the print component 104 should be replaced.

In some examples, the amount of life remaining in the print component 104 can be associated with an amount of life remaining for a component (or components) in the print component 104. For example, the print component 104 can be an organic photoconductor (OPC) drum. The computing device 102 can receive attributes of the OPC drum of the print component 104 and determine, via a rotation counter, that a number of rotations of the OPC drum has exceeded a threshold amount of rotations. In such an instance, the computing device 102 can determine the print component 104 is at an end of use condition and in response, determine the print component 104 should be replaced. In some examples, the rotation threshold can be modifiable based on environmental conditions (e.g., temperature, pressure, humidity, dust conditions, etc.) and/or coverage. As another example, the print component 104 can be a fuser, and the computing device 102 can receive attributes of the fuser including a number of rotations of the fuser (e.g., dictating whether the fuser surface may be worn out), a temperature selected for fusing operations, etc. and determine, based on the attributes, that the fuser has exceeded a number of rotations, has exceeded a threshold amount of time at an exposed temperature, etc. In such an instance, the computing device 102 can determine the print component 104 is at an end of use condition and should be replaced, recycled, etc.

In some examples, the print component 104 can be printing device itself. For example, the print device 106 may be a printer having a permanent supply of print material that is to be sent back to a shipping location 110 when the print material supply is exhausted. In such an instance, the computing device 102 can determine the print component 104 (e.g., the printing device 106) is at an end of use condition in response to the print material being exhausted (e.g., below/exceeding a threshold amount) and in response, determine the print component 104 should be replaced.

Although the amount of life remaining for the print component 104 is described above as including an amount of print material remaining in the print component 104 being less than a threshold amount and a component (e.g., an OPC drum) exceeding a threshold amount of rotations, examples of the disclosure are not so limited. For example, the component can be any other component of the print component 104 that can include an attribute that can be tracked.

Additionally, although the computing device 102 is described above as receiving attributes from the printing device 106 or the mobile device 108 automatically, examples of the disclosure are not so limited. For example, a user may utilize a portal (e.g., a web link or other portal) to manually input information about the print component 104 and transmit the information to the computing device 102 via the portal.

In response to the amount of life remaining determination, the computing device 102 can transmit a notification to the printing device 106 and/or the mobile device 108. The notification can notify a user of the printing device 106 and/or the mobile device 108 that the print component 104 is at an end of use condition and is to be replaced. Further, the notification can query a user as to whether the user would like to sustainably process the end of use print component 104. The user can input an answer to the query. In some examples, the notification can be received by the mobile device 108 and the user can input an answer (e.g., a yes to sustainably process the end of use print component 104) via the app through the mobile device 108 user interface. In some examples, the notification can be received by the printing device 106 and the user can input an answer (e.g., a yes to sustainably process the end of use print component 104) via a user interface of the printing device 106. The input (e.g., the yes answer) can be transmitted to the computing device 102.

Once the input is received, it can be received by the computing device 102 (after being transmitted) in response to the notification. In some examples, the computing device 102 can receive the input from the printing device 106. In some examples, the computing device 102 can receive the input from the mobile device 108. The computing device 102 can determine, via the input, whether to sustainably process the end of use print component 104. As used herein, the term "sustainably process" refers to a series of actions directed toward a purpose performed in a way so as to utilize natural resources without or minimizing environmental damage. For example, the computing device 102 can determine to process the end of use print component 104 in order to reduce a carbon footprint associated with processing the end of use print component 104, as is further described herein.

To sustainably process the end of use print component 104, the computing device 102 can determine a processing mechanism for the end of use print component 104. As used herein, the term "processing mechanism" refers to the means by which a series of actions are directed toward accomplishing a purpose. For example, the processing mechanism can be a series of steps taken in order to sustainably process the end of use print component 104, as is further described herein. The computing device 102 can determine the processing mechanism based on usage attributes of the end of use print component 104 and/or a shipping location 110, as is further described herein.

As used herein, the term "usage attributes" refers to a property associated with usage of a print component. Usage attributes of the print component 104 can include a type of print component 104 (e.g., a process/toner cartridge (e.g., P-Cart/T-Cart), discrete supplies (e.g., toner, developer drum (including a toner cartridge), etc.), a type of drum, a type of imaging/transfer assembly, a type of fuser, a type of printhead, etc.), a historical life of the print component 104 (e.g., amount of times a print material supply has been refilled, an amount of times the print component 104 has been refurbished, etc., where such attributes may be specific to a part stock-keeping unit (SKU), and/or vintage, stored in memory in the computing device 102), print component attributes (e.g., an amount of print material in a print material supply, a usage rate of the print material by the printing device 106, etc.), error codes (e.g., any errors experienced by the print component 104), among other examples of usage attributes. The computing device 102 can determine the processing mechanism for the end of use print component 104 based on the usage attributes of the print component 104 and/or a shipping location 110, as is further described herein.

In some examples, the processing mechanism for the print component 104 can include refilling the print component 104 when the print component 104 is a print material supply. For example, the computing device 102 can determine that based on the usage attributes indicating that according to the historical life the print component 104 has been refilled with print material once prior and such refill amounts are less than a threshold amount of refills (e.g., less than four), the print component 104 has not experienced any error codes, and the print component 104 is of a type that can be refilled, the computing device 102 can determine the processing mechanism to be refilling the print component 104 with print material. In some examples, the computing device 102 can determine that in addition to utilizing the above mentioned usage attributes, a shipping location 110-1 that can refill the print component 104 is geographically proximate enough to a geographic location of the printing device 106 that an environmental cost of shipping the print component 104 for refilling does not outweigh the environmental cost of refurbishing, recycling, or discarding the print component 104 and as such can select the shipping location 110-1.

Although the computing device 102 is described above as utilizing historical life of the print component 104, error codes, and a type of print component as usage attributes to determine the processing mechanism for the print component 104, examples of the disclosure are not so limited. For example, the computing device 102 can utilize any other combination of usage attributes to determine the processing mechanism for the print component 104. Further, the computing device 102 can utilize the usage attributes alone or the usage attributes in combination with a shipping location 110 (including shipping location attributes, as is further described herein) to determine a processing mechanism for the print component 104.

In some examples, the processing mechanism for the print component 104 can include refurbishing the print component 104. As used herein, the term "refurbish" refers to repairing or rebuilding of an object to a condition at which it can perform its intended function with reused, repaired, and/or new parts. Refurbishing the print component 104 therefore can include restoring the print component 104 from an end of use condition to restore an amount of life to the print component 104 such that the print component 104 can be utilized in a print job.

For example, the computing device 102 can determine that based on the usage attributes indicating that according to the historical life the print component 104 has not been refurbished and such refurbish amounts are less than a threshold amount of refurbishments (e.g., less than two) and the print component 104 has not experienced any error codes, the computing device 102 can determine the processing mechanism to be refurbishing the print component 104. In some examples, the computing device 102 can determine that in addition to utilizing the above mentioned usage attributes, a shipping location 110-1 that can refurbish the print component 104 is geographically proximate enough to a geographic location of the printing device 106 that an environmental cost of shipping the print component 104 for refurbishing does not outweigh the environmental cost of recycling or discarding the print component 104 and as such can select the shipping location 110-1.

In some examples, the processing mechanism for the print component 104 can include recycling the print component 104. As used herein, the term "recycle" refers to converting material comprising an object into reusable material. Recycling the print component 104 therefore can include breaking down the materials comprising the print component 104 and converting them for use in other objects and/or processes.

As an example, the computing device 102 can determine that based on the usage attributes indicating that according to the historical life the print component 104 has been refurbished twice and such refurbish amounts exceed a threshold amount of refurbishments (e.g., one), the print component 104 has been refilled three times and such refill amounts exceed a threshold amount of refills (e.g., two), the print component 104 is of a type that is unable to be refilled, and/or the print component 104 has experienced an error code(s), the computing device 102 can determine the processing mechanism to be recycling the print component 104. However, examples of the disclosure are not so limited. For example, the computing device 102 can determine, utilizing any other usage attribute and/or combination of usage attributes to determine the processing mechanism to be recycling the print component 104.

In some examples, the computing device 102 can determine that in addition to utilizing the above mentioned usage attributes, a shipping location 110-3 that can refurbish the print component 104 is geographically too far away from a geographic location of the printing device 106 that an environmental cost of shipping the print component 104 for refurbishing to the shipping location 110-3 outweighs the environmental cost of shipping the print component 104 to shipping location 110-1 for recycling and as such can select the processing mechanism to be recycling, and/or select the shipping location to be the shipping location 110-1. For example, the shipping location 110-3 can be in China and the shipping location 110-1 can be in Colorado in the United States, where the printing device 106 is located in Idaho in the United States, and as such the environmental cost of shipping the print component 104 to China for refurbishing outweighs the environmental cost of shipping the print component 104 to Colorado for recycling so the computing device 102 selects the shipping location 110-1.

In addition to determining a processing mechanism, the computing device 102 can determine a shipping location 110 to sustainably process the end of use print component 104. As used herein, the term "shipping location" refers to a geographic area to which an object is transported. In some examples, the shipping location 110 can be associated with a processing mechanism. For example, shipping location 110-1 may be utilized for refilling print components (e.g., when the print component is a print material supply), shipping location 110-2 may be utilized for refurbishing print components, and shipping location 110-3 may be utilized for recycling print components. However, examples of the disclosure are not so limited. For example, shipping locations 110 may be utilized for multiple purposes (e.g., shipping location 110-1 is utilized for refurbishing and refilling, shipping location 110-2 is utilized for recycling and refilling, etc.)

The computing device 102 can determine the shipping location 110 based on the processing mechanism (e.g., selected as described above), usage attributes of the print component 104, and/or shipping location attributes of the shipping locations 110. As used herein, the term "shipping location attributes" refers to a property associated with a shipping location. Shipping location attributes can include how busy a particular shipping location 110 is, types of processing mechanisms offered by the shipping location 110, geographical location of the shipping location 110, a prioritization/quota system information associated with the shipping locations 110, etc. The computing device 102 can receive shipping location attributes from the shipping locations 110.

For example, the computing device 102 can determine that based on the print component 104 being selected for refilling, the geographical location of the shipping location being within a threshold distance from a geographical location of the printing device 106, and/or the shipping location 110 having to process an amount of print components to meet a quota, the computing device 102 can determine the shipping location 110 to be shipping location 110-1, as the shipping location 110-1 can refill the print component 104, is within a geographical threshold distance of the geographical location of the printing device 106, and/or the shipping location 110 has to process fifty additional print components to meet a location quota.

Although the computing device 102 is described above as utilizing the type of processing mechanism, the geographical location of the shipping location 110-1 relative to the geographical location of the printing device 106, and/or a quota for the shipping location 110-1 to determine a shipping location 110-1, examples of the disclosure are not so limited. For example, the computing device 102 can utilize any other combination of the processing mechanism, usage attributes of the print component 104, and/or any sub-combination of shipping location attributes to determine the shipping location 110 for the print component 104.

In some examples, a user associated with the mobile device 108 and/or the printing device 106 can select the processing mechanism and/or the shipping location. For example, a user can utilize a user interface of the printing device 106 and/or a user interface of the mobile device 108 (e.g., via an app associated with the printing device 106) to select a particular processing mechanism (e.g., refilling, refurbishing, or recycling) for the print component 104 and/or the shipping location 110-1, 110-2, 110-3, 110-N.

Utilizing the shipping location 110, the computing device 102 can generate a shipping label for the end of use print component 104 associated with the shipping location. As used herein, the term "shipping label" refers to an identification tag that describes a shipment of an object. The shipping label can be generated to include information such as an origin/return address (e.g., an address corresponding to a geographic location of the printing device 106), a destination address (e.g., an address corresponding to a shipping location 110), a shipment weight, type of shipment (e.g., normal, express, etc.), tracking number, etc. The shipping label can be comprised of a barcode, a data matrix, a quick response (QR) code, and/or any combination thereof, among other types of shipping labels.

The computing device 102 can generate the shipping label for the print component 104 with a shipping service 112. As used herein, the term "shipping service" refers to a service that can transport objects from one location (e.g., an origin) to another location (e.g., a destination). The computing device 102 can communicate with the shipping service 112 via, for instance, a network relationship to generate the shipping label. In some examples, the computing device 102 can cause the shipping service 112 to generate and deliver the shipping label to a user of the printing device 106 and transmit shipping label information to the computing device 102. In some examples, the computing device 102 can cause the shipping service 112 to generate the shipping label and transmit the shipping label information to the computing device 102 for transmission to the printing device 106 and/or the mobile device 108, as is further described herein. Utilizing the shipping label, a user associated with the printing device 106 can cause the print component 104 to be shipped to a shipping location 110 by the shipping service 112.

In some examples, when the shipping label is generated, the computing device 102 can transmit the shipping label to the printing device 106 and/or the mobile device 108. In some examples, the computing device 102 can transmit the shipping label to the printing device 106 to cause the printing device 106 to print the shipping label. In some examples, the computing device 102 can transmit the shipping label to the mobile device 108 associated with a user of the printing device 106 (e.g., by email, text, to an app, etc.). In some examples, the computing device 102 can transmit a request to the shipping service 112 to pick up the print component 104 at a location of the printing device 106. The mobile device 108 can, in some instances, display the shipping label on a user interface of a display of the mobile device 108 to allow for scanning of the shipping label. Accordingly, the shipping label generated by the computing device 102 can be utilized to ship the end of use print component 104 to the selected shipping location 110.

Accordingly, shipping print components according to the disclosure can allow for the determination of how to sustainably process an end of use print component. By automatically determining how to sustainably process the end of use print component and where to ship the end of use print component, lifecycle assessment of such an end of use print component can be accomplished while increasing sustainability and reducing a carbon footprint of end of use print component processing operations as compared with previous approaches.

Figure 2:
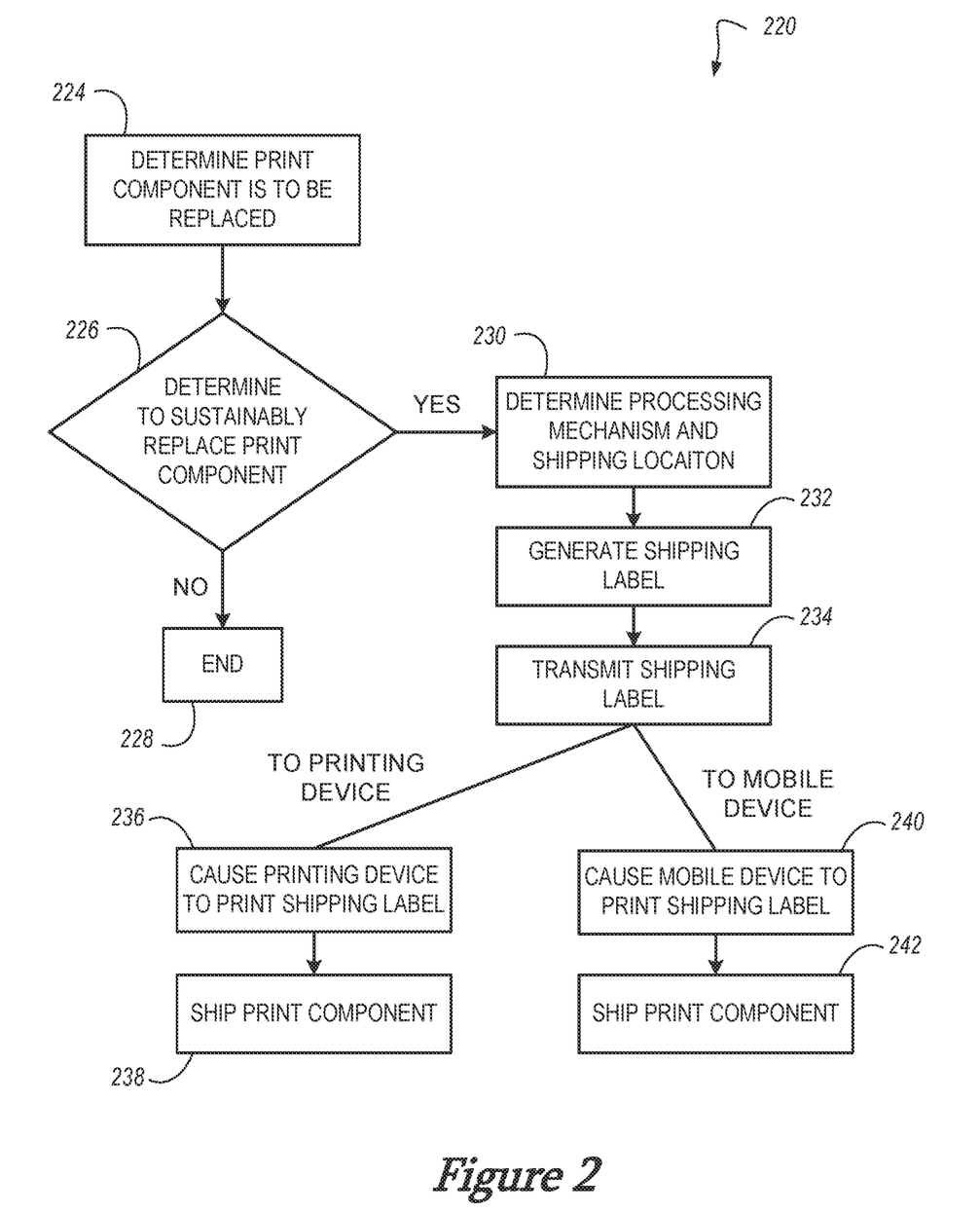
FIG. 2 is an example flow chart for shipping print components consistent with the disclosure.

FIG. 2 is an example flow chart 220 for shipping print components consistent with the disclosure. At 224, a computing device (e.g., computing device 102) can determine whether a print component is to be replaced utilizing attributes received from a printing device including the print component. In response, the computing device can transmit a notification to the printing device and/or a mobile device associated with the printing device.

At 226, the computing device can determine whether to sustainably process the print component. For example, a user can transmit an input in response to the notification to sustainably process the print component. If, at 228, the user does not wish to sustainably process the print component, the method ends. However, if the user does wish to sustainably process the print component, the computing device can, at 230, determine a processing mechanism and a shipping location for the end of use print component. For example, the computing device can determine whether to refill, refurbish, or recycle the print component and where to ship the print component for such a processing mechanism to take place.

Once the computing device has determined where the shipping location is, the computing device can, at 232, generate a shipping label. The shipping label can correspond to the determined shipping location. The shipping label can, at 234, be transmitted to a printing device and/or to a mobile device.

When transmitted to a printing device, the computing device can cause, at 236, the printing device to print the shipping label. Utilizing the printed shipping label, the print component can be shipped at 238.

When transmitted to a mobile device, the computing device can cause, at 240, the mobile device to display the shipping label. Utilizing the displayed shipping label, the print component can be shipped at 242.

Figure 3:
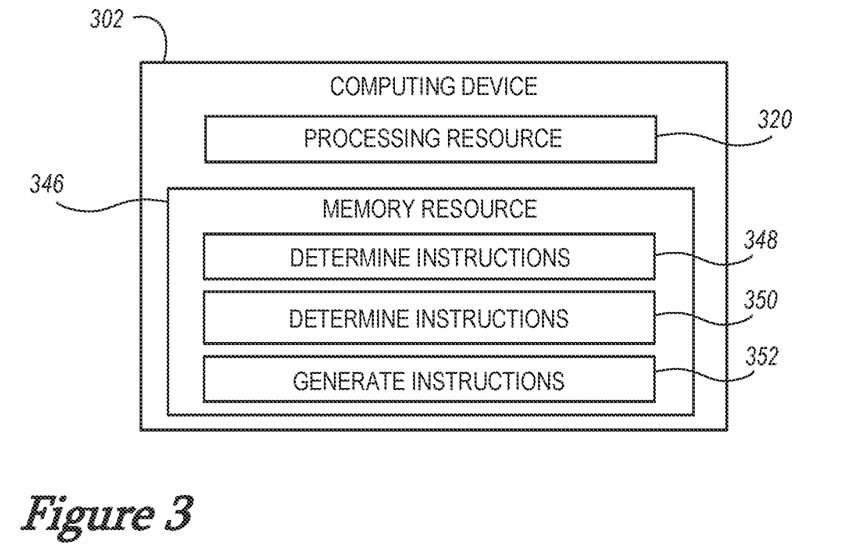
FIG. 3 is an example of a computing device for shipping print components consistent with the disclosure.

FIG. 3 is an example of a computing device 302 for shipping print components consistent with the disclosure. As described herein, the computing device 302 may perform functions related to shipping print components. Although not illustrated in FIG. 3, the computing device 302 may include a processor and a machine-readable storage medium. Although the following descriptions refer to a single processor and a single machine-readable storage medium, the descriptions may also apply to a system with multiple processors and multiple machine-readable storage mediums. In such examples, the computing device 302 may be distributed across multiple machine-readable storage mediums and across multiple processors. Put another way, the instructions executed by the computing device 302 may be stored across multiple machine-readable storage mediums and executed across multiple processors, such as in a distributed or virtual computing environment.

Processing resource 344 may be a central processing unit (CPU), a semiconductor-based microprocessor, and/or other hardware devices suitable for retrieval and execution of machine-readable instructions 348, 350, 352 stored in a memory resource 346. Processing resource 344 may fetch, decode, and execute instructions 348, 350, 352. As an alternative or in addition to retrieving and executing instructions 348, 350, 352, processing resource 344 may include a plurality of electronic circuits that include electronic components for performing the functionality of instructions 348, 350, 352.

Memory resource 346 may be any electronic, magnetic, optical, or other physical storage device that stores executable instructions 348, 350, 352, and/or data. Thus, memory resource 346 may be, for example, Random Access Memory (RAM), an Electrically-Erasable Programmable Read-Only Memory (EEPROM), a storage drive, an optical disc, and the like. Memory resource 346 may be disposed within computing device 302, as shown in FIG. 3. Additionally, memory resource 346 may be a portable, external or remote storage medium, for example, that causes computing device 302 to download the instructions 348, 350, 352 from the portable/external/remote storage medium.

The computing device 302 may include instructions 348 stored in the memory resource 336 and executable by the processing resource 334 to determine, via an input, whether to sustainably process a print component associated with a printing device. For example, an input can be transmitted to the computing device 302 from a mobile device and/or from the printing device to indicate whether to sustainably process the print component.

The computing device 302 may include instructions 350 stored in the memory resource 336 and executable by the processing resource 334 to determine, in response to the determination to sustainably process the print component, a processing mechanism for the print component and a shipping location to ship the print component. The processing mechanism can include, for example, refilling, refurbishing, or recycling the print component.

The computing device 302 may include instructions 352 stored in the memory resource 336 and executable by the processing resource 334 to generate a shipping label for the print component associated with the shipping location. For example, the shipping label generated can allow for the shipment of the print component to the shipping location.

Figure 4:
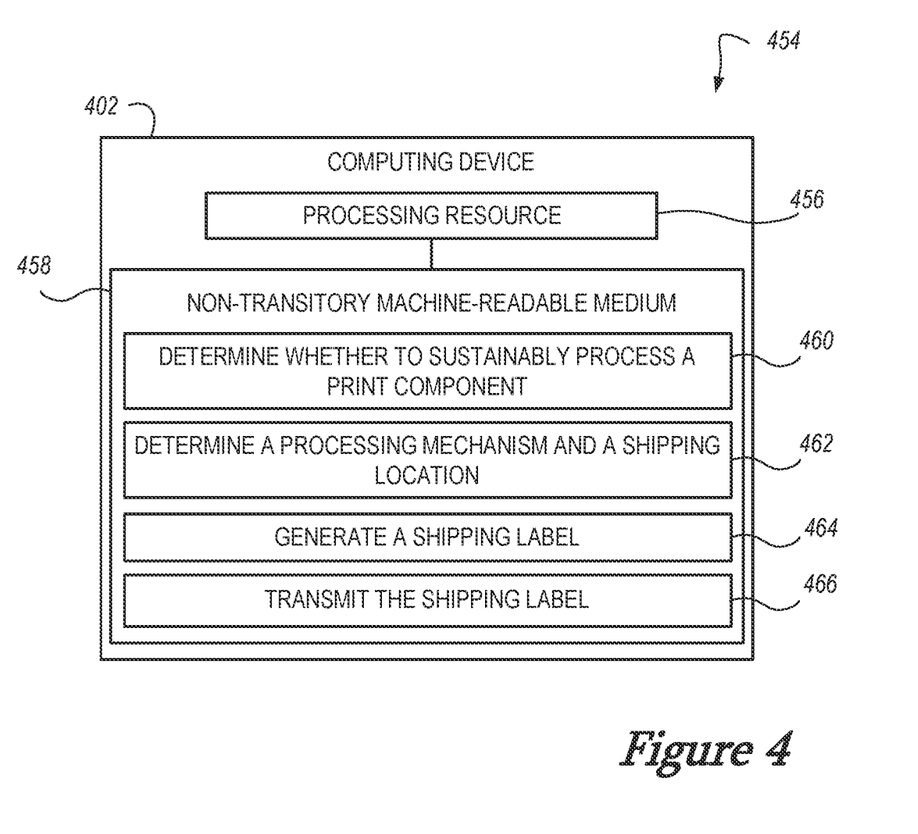
FIG. 4 is a block diagram of an example system for shipping print components consistent with the disclosure.

FIG. 4 is a block diagram of an example system 454 for shipping print components consistent with the disclosure. In the example of FIG. 4, system 454 includes a computing device 402 including a processing resource 456 and a non-transitory machine-readable storage medium 458. Although the following descriptions refer to a single processing resource and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processing resource 456 may be a central processing unit (CPU), microprocessor, and/or other hardware device suitable for retrieval and execution of instructions stored in machine-readable storage medium 458. In the particular example shown in FIG. 4, processing resource 456 may receive, determine, and send instructions 460, 462, 464, 466. As an alternative or in addition to retrieving and executing instructions, processing resource 456 may include an electronic circuit comprising a number of electronic components for performing the operations of the instructions in machine-readable storage medium 458. With respect to the executable instruction representations or boxes described and shown herein, it should be understood that part or all of the executable instructions and/or electronic circuits included within one box may be included in a different box shown in the figures or in a different box not shown.

Machine-readable storage medium 458 may be any electronic, magnetic, optical, or other physical storage device that stores executable instructions. Thus, machine-readable storage medium 458 may be, for example, Random Access Memory (RAM), an Electrically-Erasable Programmable Read-Only Memory (EEPROM), a storage drive, an optical disc, and the like. The executable instructions may be "installed" on the system 454 illustrated in FIG. 4. Machine-readable storage medium 458 may be a portable, external or remote storage medium, for example, that allows the system 454 to download the instructions from the portable/external/remote storage medium. In this situation, the executable instructions may be part of an "installation package".

Determine whether to sustainably process a print component instructions 460, when executed by a processor such as processing resource 456, may cause system 454 to determine, via an input, whether to sustainably process an end of use print component associated with a printing device. An amount of life remaining in the end of use print component can be less than a threshold amount. An input can be transmitted to the computing device 402 from a mobile device and/or from the printing device to indicate whether to sustainably process the print component.

Determine a processing mechanism and a shipping location instructions 462, when executed by a processor such as processing resource 456, may cause system 454 to determine, in response to a determination to sustainably process the end of use print component, a processing mechanism for the end of use print component and a shipping location associated with the processing mechanism to ship the end of use print component. The processing mechanism can include, for example, refilling, refurbishing, or recycling the print component.

Generate a shipping label instructions 464, when executed by a processor such as processing resource 456, may cause system 454 to generate a shipping label for the end of use print component associated with the shipping location. The shipping label generated can allow for the shipment of the end of use print component to the shipping location.

Transmit the shipping label instructions 466, when executed by a processor such as processing resource 456, may cause system 454 to transmit the shipping label. The system 454 may transmit the shipping label to the printing device to cause the printing device to print the shipping label and/or transmit the shipping label to a mobile device associated with a user of the printing device.

Figure 5:
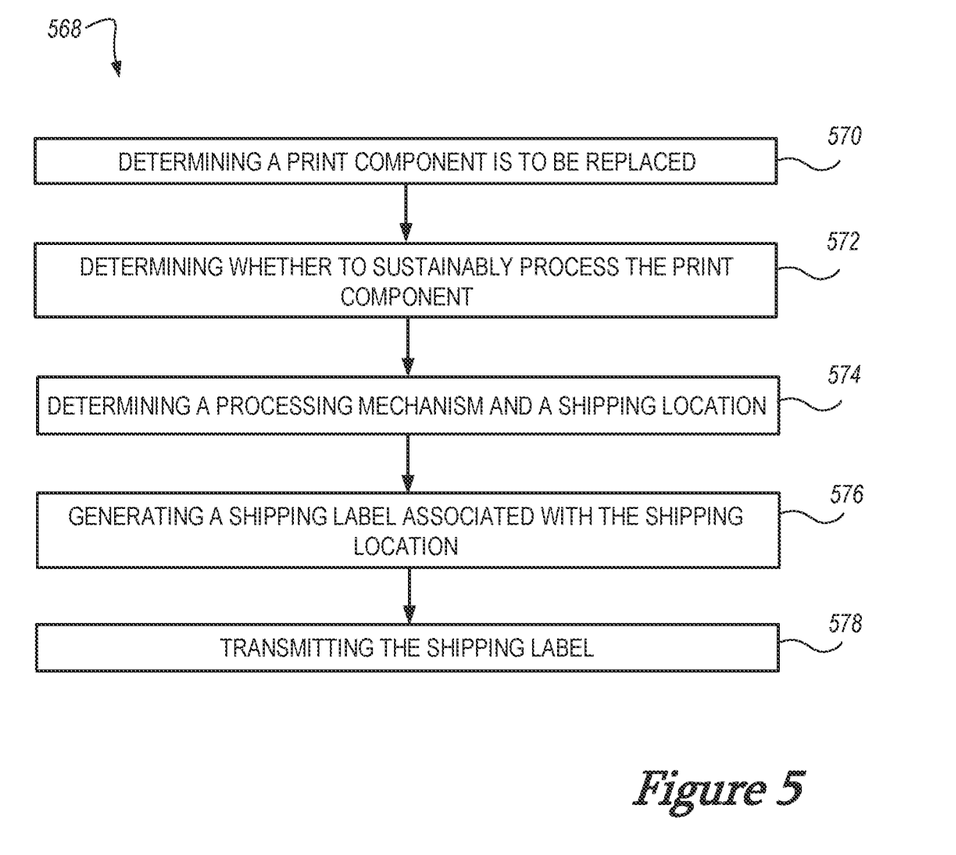
FIG. 5 is an example of a method for shipping print components consistent with the disclosure.

FIG. 5 is an example of a method 568 for shipping print components consistent with the disclosure. The method 568 can be performed by a computing device (e.g., computing device 102, 302, and 402, previously described in connection with FIGS. 1, 3, and 4, respectively).

At 570, the method 568 includes transmitting determining, by the computing device in response to receiving attributes of an end of use print component from an associated printing device, the end of use print component is to be replaced. For example, the computing device can determine the end of use print component has an amount of life remaining that is less than a threshold amount and in response, determine the end of use print component is to be replaced.

At 572, the method 568 includes determining, via an input received by the computing device, whether to sustainably process the end of use print component. For example, an input can be transmitted to the computing device from a mobile device and/or from the printing device to indicate whether to sustainably process the print component.

At 574, the method 568 includes determining, by the computing device in response to the determination to sustainably process the end of use print component, a processing mechanism for the end of use print component and a shipping location associated with the processing mechanism to ship the end of use print component. The processing mechanism can include, for example, refilling, refurbishing, or recycling the print component.

At 576, the method 568 includes generating, by the computing device, a shipping label for the end of use print component associated with the shipping location. The shipping label generated can allow for the shipment of the print component to the shipping location.

At 578, the method 568 includes transmitting, by the computing device, the shipping label to the printing device and/or the mobile device associated with the user of the printing device. The printing device can print the shipping label and the mobile device can display the shipping label. Utilizing the transmitted shipping label, the end of use print component can be shipped to the determined shipping location for processing according to the determined processing mechanism.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" can refer to one such thing or more than one such thing.

The figures herein follow a numbering convention in which the first digit corresponds to the drawing figure number and the remaining digits identify an element or component in the drawing. For example, reference numeral 100 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A computing device comprising:
   a processor; and
   a memory resource storing instructions executable by the processor to:
      determine, via an input, whether to sustainably process a print consumable associated with a printing device, based on whether the print consumable has reached an end of life;
      in response to a determination to sustainably process the print consumable, determine:
         usage attributes of the print consumable;
         whether to refill, refurbish, or recycle the print consumable, based on the determined usage attribute; and
         a shipping location to ship the print consumable, based on whether the print consumable has been determined to be refilled, refurbished, or recycled; and
      generate a shipping label for the print consumable associated with the shipping location,
      wherein the print consumable is shipped to the shipping location using the shipping label, and upon receipt at the shipping location is refilled, refurbished, or recycled as has been determined.

2. The computing device of claim 1, wherein the instructions are executable by the processor to cause the printing device to print the shipping label.

3. The computing device of claim 1, wherein the instructions are executable by the processor to receive the input from the printing device.

4. The computing device of claim 1, wherein the instructions are executable by the processor to receive the input from a mobile device of a user associated with the printing device.

5. A non-transitory machine-readable storage medium storing instructions executable by a processor to:
   determine, via an input, whether to sustainably process a print consumable associated with a printing device, based on whether the print consumable has reached an end of life in that an amount of life remaining of the print consumable is less than a threshold amount;
   in response to a determination to sustainably process the print consumable:
      usage attributes of the print consumable;
      whether to refill, refurbish, or recycle the print consumable; and
      a shipping location associated with whether the print consumable has been determined to be refilled, refurbished, or recycled;
   generate a shipping label for the print consumable associated with the shipping location; and
   transmit the shipping label to at least one of:
      the printing device to cause the printing device to print the shipping label; and
      a mobile device associated with a user of the printing device,
   wherein the print consumable is shipped to the shipping location using the shipping label, and upon receipt at the shipping location is refilled, refurbished, or recycled as has been determined.

6. The non-transitory storage medium of claim 5, wherein the shipping location is determined from a plurality of shipping locations based on shipping location attributes of the plurality of shipping locations and based on whether the print consumable has been determined to be refilled, refurbished, or recycled.

7. A method comprising:
   determining, by a computing device in response to receiving attributes of a print consumable from an associated printing device, whether the print component consumable is to be sustainably processed, based on whether the print consumable has reached an end of life;
   in response to a determination to sustainably process the print consumable, determining, by the computing device:
      usage attributes of the print consumable;
      whether to refill, refurbish, or recycle the print consumable, based on the determined usage attributes; and
      a shipping location associated with whether the print consumable has been determined to be refilled, refurbished, or recycled;
   generating, by the computing device, a shipping label for the print consumable associated with the shipping location; and
   transmitting, by the computing device, the shipping label to at least one of:
      the printing device to cause the printing device to print the shipping label; and
      a mobile device associated with a user of the printing device,.
   wherein the print consumable is shipped to the shipping location using the shipping label, and upon receipt at the shipping location is refilled, refurbished, or recycled as has been determined.

8. The method of claim 7, wherein determining that the print consumable is to be substantially processed comprises determining that an amount of life remaining of the print consumable is less than a threshold amount.

9. The method of claim 8, further comprising transmitting, by the computing device, a notification to at least one of the printing device and the mobile device in response to the amount of life remaining being less than the threshold amount.

10. The method of claim 9, further comprising receiving an input from at least one of the printing device and the mobile device in response to receiving the notification.

11. The method of claim 7, further comprising generating the shipping label with using a shipping service.

* * * * *